US010270966B2

(12) United States Patent
Choe et al.

(10) Patent No.: US 10,270,966 B2
(45) Date of Patent: Apr. 23, 2019

(54) PROFILES IDENTIFYING CAMERA CAPABILITIES

(71) Applicant: Microsoft Technology Licensing, LLC, Redmond, WA (US)

(72) Inventors: Sang Kun Choe, Redmond, WA (US); Leonard D. Zuvela, Mukilteo, WA (US); Mei L. Wilson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

(21) Appl. No.: 15/666,099

(22) Filed: Aug. 1, 2017

(65) Prior Publication Data

US 2017/0332012 A1 Nov. 16, 2017

Related U.S. Application Data

(63) Continuation of application No. 14/623,302, filed on Feb. 16, 2015, now Pat. No. 9,729,785.

(Continued)

(51) Int. Cl.
*H04N 5/232* (2006.01)
*H04N 5/343* (2011.01)
*G08B 13/196* (2006.01)

(52) U.S. Cl.
CPC ..... *H04N 5/23222* (2013.01); *H04N 5/23245* (2013.01)

(58) Field of Classification Search
CPC ............... H04N 5/232; H04N 5/23203; H04N 13/0239; H04N 13/0055; H04N 13/0296;

(Continued)

(56) References Cited

U.S. PATENT DOCUMENTS 6,136,816 A 10/2000 Knauf-Beiter et al.
6,163,816 A 12/2000 Anderson et al.
(Continued)

FOREIGN PATENT DOCUMENTS

EP 1521455 4/2005

OTHER PUBLICATIONS

"Camera—Android Developers", Retrieved From: <https://stuff.mit.edu/afs/sipb/project/android/docs/guide/topics/media/camera.html> Jan. 11, 2015, Jan. 2, 2013, 26 Pages.
(Continued)

*Primary Examiner* — Marly S Camargo
(74) *Attorney, Agent, or Firm* — Scott Y. Shigeta; Leonard Hope; Newport IP, LLC

(57) ABSTRACT

A computing device includes one or more camera systems, each camera system including software and/or hardware to provide various different camera-related capabilities. The camera system maintains one or more profiles, each profile identifying different capabilities of the camera system that the computing device is configured to use concurrently. The one or more profiles are provided to a program on the computing device, allowing the program to know which capabilities the computing device is configured to use concurrently. If a profile provided by the camera system indicates that the computing device is configured to use certain capabilities concurrently (e.g., capturing images and recording video at certain resolutions), then the program allows a user to select options for using those capabilities concurrently. However, if no such profile exists, the program does not allow a user to select options for using those capabilities concurrently.

20 Claims, 9 Drawing Sheets

Related U.S. Application Data

(60) Provisional application No. 62/105,073, filed on Jan. 19, 2015.

(58) Field of Classification Search
CPC ............ H04N 5/23222; H04N 5/3356; H04N 5/23245; H04N 5/343; G08B 13/196; G08B 13/19645
USPC ..... 348/207.11, 211.99, 211.3, 211.4, 211.6, 348/211.8, 211.11, 143, 42, 47, 48, 348/211.13, 211.2; 725/105; 709/205, 709/223, 224, 225, 226, 229, 227; 715/203, 204
See application file for complete search history.

(56) References Cited

U.S. PATENT DOCUMENTS

| | | | |
|---|---|---|---|
| 6,888,567 B2 | 5/2005 | Watanabe | |
| 6,897,891 B2 | 5/2005 | Itsukaichi | |
| 6,970,189 B1* | 11/2005 | Bernstein | H04N 5/232 348/232 |
| 7,093,031 B2 | 8/2006 | Ray et al. | |
| 7,881,919 B2 | 2/2011 | Trumble et al. | |
| 7,948,524 B2 | 5/2011 | Endo et al. | |
| 8,290,291 B2 | 10/2012 | Lee et al. | |
| 8,368,773 B1 | 2/2013 | Jin | |
| 8,589,866 B2 | 11/2013 | Sekine et al. | |
| 8,671,435 B2* | 3/2014 | Bae | H04N 7/173 |
| 8,743,432 B2 | 6/2014 | Buswell et al. | |
| 9,047,504 B1 | 6/2015 | Ramaswamy et al. | |
| 9,413,942 B2* | 8/2016 | Cho | H04N 5/232 348/207.11 |
| 9,729,785 B2* | 8/2017 | Choe | H04N 5/23222 725/105 |
| 2005/0207486 A1 | 9/2005 | Lee et al. | |
| 2007/0296820 A1 | 12/2007 | Lonn | |
| 2008/0024614 A1 | 1/2008 | Li et al. | |
| 2008/0064437 A1 | 3/2008 | Chambers et al. | |
| 2011/0058052 A1 | 3/2011 | Bolton et al. | |
| 2011/0058053 A1 | 3/2011 | Roh | |
| 2011/0228117 A1 | 9/2011 | Inoue | |
| 2012/0062558 A1 | 3/2012 | Lee et al. | |
| 2012/0284702 A1 | 11/2012 | Ganapathy et al. | |
| 2014/0192224 A1* | 1/2014 | Laroia | G06T 11/60 348/224.1 |
| 2014/0095578 A1 | 4/2014 | Rajendran et al. | |
| 2014/0176736 A1* | 6/2014 | Sato | H04N 5/23241 348/207.11 |
| 2014/0192214 A1* | 7/2014 | Laroia | H04N 5/2258 348/218.1 |
| 2014/0232892 A1 | 8/2014 | Campbell | |
| 2014/0344480 A1 | 11/2014 | Borve et al. | |
| 2015/0054967 A1* | 2/2015 | Nagaike | H04N 1/00129 725/105 |
| 2015/0092066 A1 | 4/2015 | Geiss et al. | |
| 2016/0212329 A1 | 7/2016 | Choe et al. | |
| 2018/0063422 A1* | 3/2018 | Liu | H04N 5/23225 348/207.11 |

OTHER PUBLICATIONS

"Corrected Notice of Allowance", U.S. Appl. No. 14/623,302, dated Apr. 7, 2017, 2 pages.

"Corrected Notice of Allowance", U.S. Appl. No. 14/623,302, dated May 23, 2017, 2 pages.

"Final Office Action", U.S. Appl. No. 14/623,302, dated Oct. 20, 2016, 35 pages.

"International Preliminary Report on Patentability", Application No. PCT/US2015/067977, dated Mar. 16, 2017, 10 pages.

"International Search Report and Written Opinion", Application No. PCT/US2015/067977, dated Apr. 4, 2016, 12 pages.

"LiveCode—Mobile Specific Engine Features", Retrieved From: <http://livecode.com/developers/guides/mobile/mobile-specific-engine-features/> Jan. 11, 2015, Jun. 9, 2013, 20 pages.

"Non-Final Office Action", U.S. Appl. No. 14/623,302, dated Apr. 29, 2016, 26 pages.

"Notice of Allowance", U.S. Appl. No. 14/623,302, dated Feb. 8, 2017, 16 pages.

"Second Written Opinion", Application No. PCT/US2016/054574, dated Dec. 16, 2016, 8 pages.

"Windows Embedded Compact Windows CE—Camera Drivers Development", Retrieved From: <http://www.e-consystems.com/windowsce-camera-driver-development.asp> Jan. 11, 2015, 2014, 4 pages.

"Windows Phone 8.1—Windows Phone Hardware Development", Retrieved From: <http://dev.windowsphone.com/it-it/OEM/docs/Welcome/Windows_Phone_8.1> Jan. 11, 2015, Dec. 15, 2014, 3 pages.

Li,"Testing Mobile Phone Camera Based Fingerprint Recognition under Real-Life Scenarios", 2012 NISK Conference—Bodo/Norway, Nov. 2012, 13 pages.

* cited by examiner

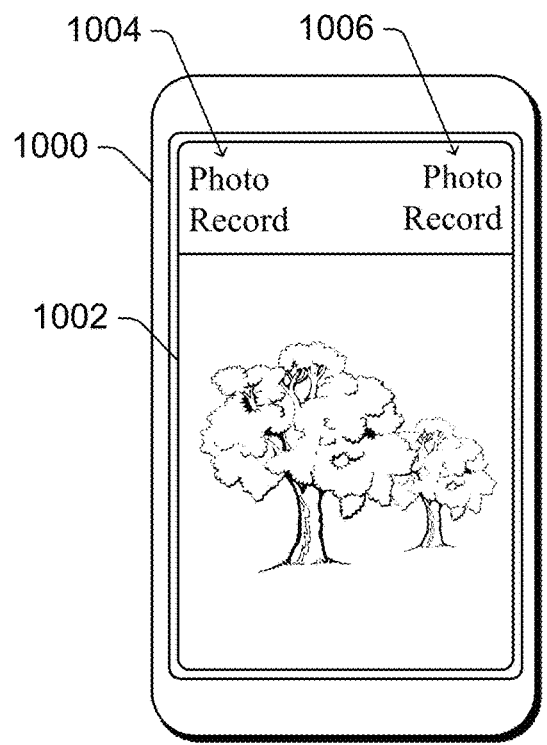 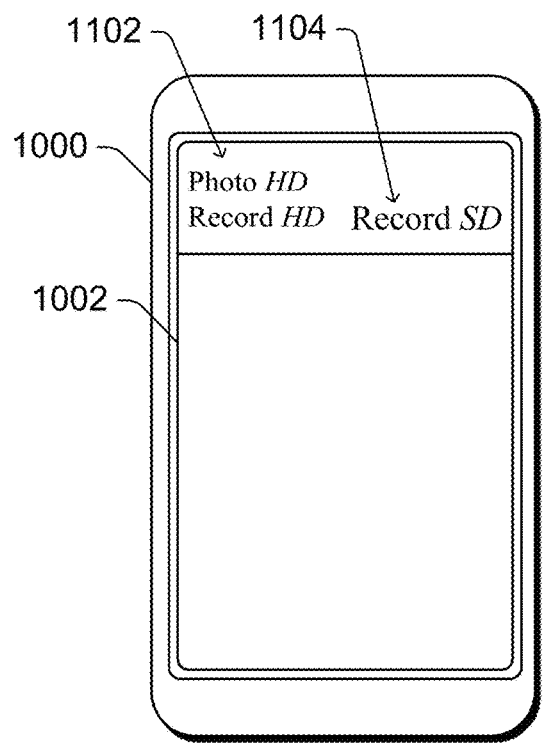
Fig. 10  Fig. 11

PROFILES IDENTIFYING CAMERA CAPABILITIES

RELATED APPLICATIONS

This application claims is a continuation of and claims priority to U.S. application Ser. No. 14/623,302, filed Feb. 16, 2015, entitled "Profiles Identifying Camera Capabilities That Are Usable Concurrently", which in turn claims priority to U.S. Provisional Application No. 62/105,073, filed Jan. 19, 2015, entitled "Profiles Identifying Camera Capabilities That Are Usable Concurrently" the disclosures of which are incorporated by reference herein in their entirety.

BACKGROUND

As computing technology has advanced, the capabilities provided by computing devices such as tablets, laptops, smartphones, and so forth has increased. These increased capabilities allow users to perform a wide range of operations with their computing devices, but the availability of these increased capabilities is not without its problems. One such problem is that the hardware constraints of the computing device may allow only certain combinations of capabilities to be used concurrently, but these combinations may not be readily apparent to a user of the computing device. This can lead to user frustration with their computing devices when attempts are made to use an incompatible combination of capabilities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a record of multiple profiles associated with a first camera system of a computing device is accessed, each profile of the multiple profiles identifying multiple, different capabilities of the first camera system that the computing device is configured to use concurrently. An indication of the multiple profiles is provided to a program of the computing device to allow the program to know which capabilities of the first camera system the computing device is configured to use concurrently. A request to concurrently use at least two of the capabilities of the first camera system is received from the program. The program is allowed to concurrently use the at least two capabilities in response to at least one of the multiple profiles indicating the computing device is configured to allow the program to use the at least two capabilities concurrently.

In accordance with one or more aspects, multiple profiles associated with a first camera system of a computing device are obtained from the first camera system. Each profile of the multiple profiles identifies multiple, different capabilities of the first camera system that the computing device is configured to use concurrently. A combination of capabilities identified in one of the multiple profiles associated with the first camera system that the computing device is configured to use concurrently is selected. Ones of the capabilities identified in the selected combination are presented as user selectable capabilities of the first camera system.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIGS. 6, 7, 8, 9, 10, and 11 illustrate examples of different manners in which a program can use profiles to present, as user selectable capabilities of the camera system, ones of the capabilities that can be used together in accordance with one or more embodiments.

DETAILED DESCRIPTION

Figure 1:
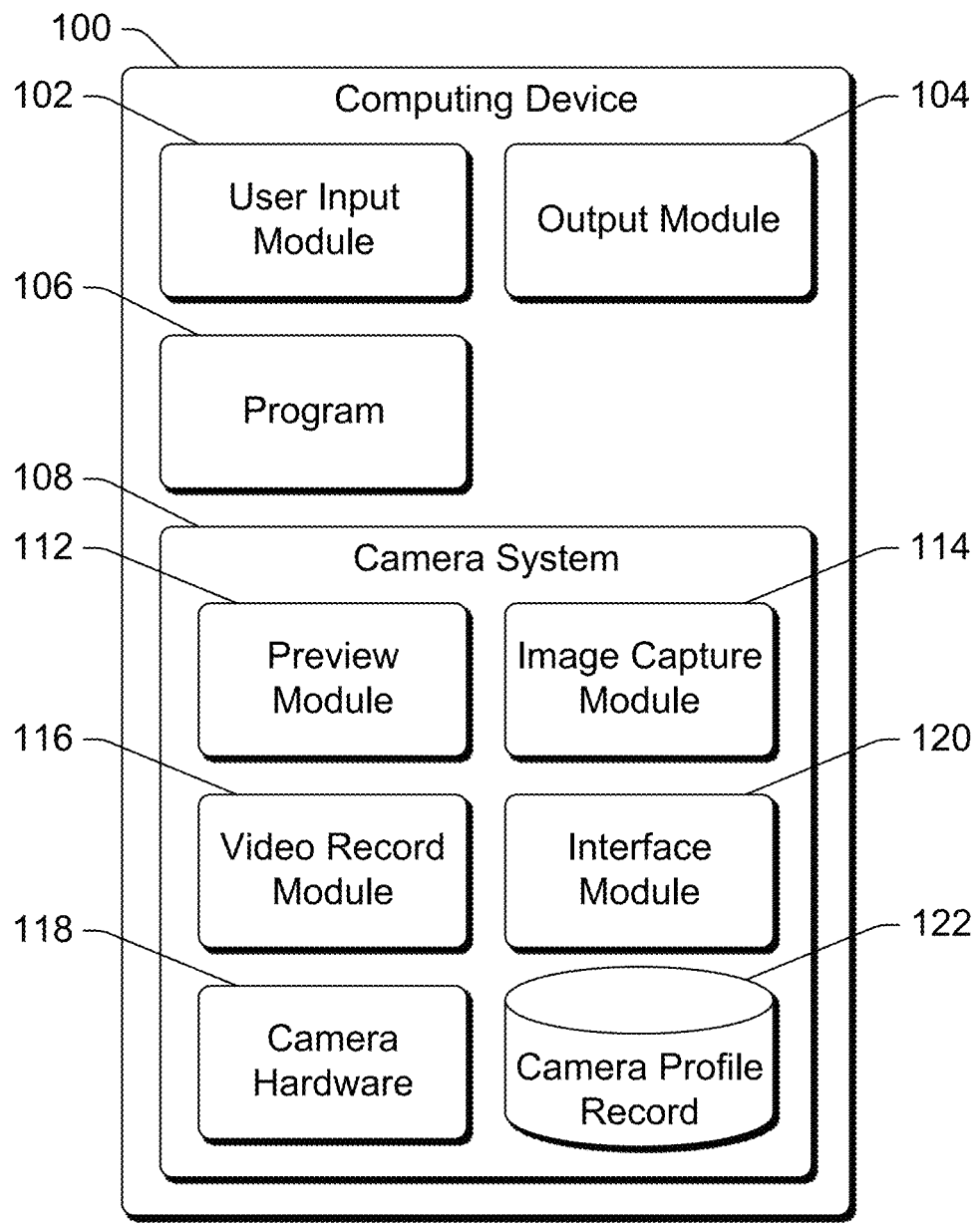
FIG. 1 is a block diagram illustrating an example computing device implementing the profiles identifying camera capabilities that are usable concurrently in accordance with one or more embodiments.

Profiles identifying camera capabilities are discussed herein. A computing device includes one or more camera systems, each camera system including software and/or hardware to provide various different camera-related capabilities. A capability of a camera system refers to a manner in which the camera system can operate. These capabilities include, for example, a photo capability to capture images at various resolutions, a record capability to record video (and optionally audio) at various resolutions, and a preview capability to display a scene currently being viewed by the camera system (the current view of the camera system) at various resolutions. Using these capabilities includes various combinations of executing software and/or using hardware of the camera system. The camera system maintains one or more profiles, each profile identifying different capabilities of the camera system that the computing device is configured to use concurrently. For example, a profile can identify one or more image resolutions that can be used to capture images concurrently with the recording of video using one or more video resolutions.

The computing device being configured to use particular capabilities concurrently refers to the computing device (including the one or more camera systems) being able to perform the particular capabilities concurrently. Being able to perform the particular capabilities concurrently refers to, for example, having the software processing ability to perform the particular capabilities concurrently, having the appropriate hardware (e.g., processors, hardware, image sensors, buffers, etc.) to perform the particular capabilities concurrently, and so forth. Being able to perform the particular capabilities concurrently can also include a qualification of being able to perform the particular capabilities concurrently at a particular rate or with a particular accuracy or speed (e.g., so as to provide a desired performance level of the computing device).

The one or more profiles are provided to a program on the computing device, allowing the program to know which different capabilities the computing device is configured to use concurrently. For example, the program can readily determine whether the camera system of the computing device can be used to capture images at a particular image resolution (e.g., 12 megapixels) concurrently with recording video at a particular video resolution (e.g., 4K resolution). If a profile provided by the camera system indicates that the camera system can capture images at the particular image resolution concurrently with recording video at the particular video resolution, then the program allows a user to select options for capturing images at the particular image resolution concurrently with recording video at the particular video resolution. However, if no such profile exists, the program does not allow a user to select options for capturing images at the particular image resolution concurrently with recording video at the particular video resolution.

The camera system profiles as discussed herein support various different usage scenarios and provide various different technical effects. These uses and effects include improving operation, reliability, and usability of the computing device by allowing users to concurrently use combinations of camera system capabilities that the camera system is able to support. Combinations of camera system capabilities that cannot be used together concurrently can be readily identified using the techniques discussed herein, and attempts to use such combinations can be avoided. These uses and effects also include managing resources (e.g., capabilities of the camera system) in a manner that allows the resources to continue to operate as intended rather than operating improperly or not operating at all. These uses and effects also include simplifying program development by making it straightforward for developers of programs to determine which camera system capabilities can be used concurrently, and provide a good user experience based on those capabilities.

FIG. 1 is a block diagram illustrating an example computing device 100 implementing the profiles identifying camera capabilities that are usable concurrently in accordance with one or more embodiments. The computing device 100 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, watch), an entertainment device (e.g., an entertainment appliance, a set-top box communicatively coupled to a display device, a game console), a television or other display device, an automotive computer, and so forth. Thus, the computing device 100 may range from full resource devices with substantial memory and processor resources (e.g., personal computers, game consoles) to low-resource devices with limited memory and/or processing resources (e.g., traditional set-top boxes, handheld game consoles).

The computing device 100 includes a user input module 102, an output module 104, a program 106, and a camera system 108. The camera system 108 includes a preview module 112, an image capture module 114, a video record module 116, camera hardware 118, an interface module 120, and a camera profile record 122. Although particular functionality is discussed herein with reference to particular modules of the computing device 100 and/or the camera system 108, it should be noted that the functionality of individual ones of these modules can be separated into multiple modules, and/or at least some functionality of multiple ones of these modules can be combined into a single module, and/or at least one of these modules may not be included in the computing device 100.

The user input module 102 receives user inputs from a user of the computing device 100. User inputs can be provided in a variety of different manners, such as by pressing one or more keys of a keypad or keyboard of the device 100, pressing one or more keys of a controller (e.g., remote control device, mouse, track pad, etc.) of the device 100, pressing a particular portion of a touchpad or touchscreen of the device 100, making a particular gesture on a touchpad or touchscreen of the device 100, and/or making a particular gesture on a controller (e.g., remote control device, mouse, track pad, etc.) of the device 100. User inputs can also be provided via other physical feedback input to the device 100, such as tapping any portion of the device 100, an action that can be recognized by a motion detection or other component of the device 100 (such as shaking the device 100, rotating the device 100, bending or flexing the device 100, etc.), and so forth. User inputs can also be provided in other manners, such as via voice or other audible inputs to a microphone, via motions of hands or other body parts observed by an image capture device, and so forth.

The output module 104 generates, manages, and/or outputs content (data) for display, playback, other presentation, storage, transfer, combinations thereof, and so forth. This content can be created by the output module 104 or obtained from other modules or programs of the computing device 100, such as the program 106. This content can be, for example, a display or playback portion of a user interface (UI), captured images, recorded video, and so forth. The content can be output to components of the computing device 100 (e.g., speakers, interactive display devices, storage devices (e.g., disks or memory), etc.). Alternatively, the output module 104 can generate one or more signals to output the content to other devices or components (e.g., speakers, display devices, storage devices (e.g., disks or memory), etc.) that are separate from the computing device 100.

The program 106 is any of a variety of different programs that access the camera system 108. The program 106 can be part of an operating system of the computing device 100 and/or an application run by an operating system of the computing device 100. The program 106 can be, for example, a camera program (e.g., for a user to capture images and record video), a video conferencing or other communication program that captures images and/or records video, and so forth.

The camera system 108 includes various software and/or hardware to implement various different image capture related and/or video recording related functionality. Although a single camera system 108 is illustrated in FIG. 1, it should be noted that the computing device 100 can include multiple camera systems, each analogous to the camera system 108. For example, the computing device 100 may be a smartphone or tablet device and have both a camera system with a front facing lens (e.g., a camera lens capturing images and/or video from a same side or surface of the computing device 100 as a plane of a display of the computing device 100) and a rear facing lens (e.g., a camera lens capturing images and/or video from an opposite side or surface of the computing device 100 as a plane of a display of the computing device 100).

The camera system 108 includes the preview module 112, the image capture module 114, the video record module 116, the camera hardware 118, the interface module 120, and the camera profile record 122. The camera hardware 118 includes a lens, image sensor (e.g., a charge-coupled device (CCD) sensor or complementary metal-oxide semiconductor (CMOS) sensor), and optionally a light to illuminate a subject or scene being captured by the image sensor. In a computing device 100 including multiple camera systems, each camera system can have its own lens, image sensor, and light, or alternatively multiple camera systems can share a lens, image sensor, and/or light. In one or more embodiments, the modules 112, 114, 116, and 120 are implemented as a driver (e.g., a software driver) associated with the camera hardware 118. Although illustrated as part of the computing device 100, at least part of the camera hardware 118 can be implemented as a component separate from the computing device 100 (e.g., as a Web camera or other hardware that is separate from the computing device 100 and coupled to the computing device by a wired or wireless connection).

The image capture module 114 provides a photo capability, managing capturing of photographs (also referred to as still images or simply images) using the camera hardware 118. The video record module 116 provides a record capability, managing the recording of video data using the camera hardware 118 (e.g., for storage, for transmission to another device via a video conference, etc.). The video record module 116 optionally also manages the recording of audio data corresponding to the video data using a microphone(s) or other audio capture device. The microphone or other audio capture device can be included as part of the camera hardware 118, or alternatively as separate hardware included in the computing device 100. The preview module 112 provides a preview capability, managing display of a current view being captured by the camera hardware 118. The current view is displayed on a display device by the output module 104.

Each of the modules 112-116 has different capabilities. The capability of a module 112, 114, or 116 refers to the manner in which that module can operate. For example, the capability of the preview module 112 refers to the manner in which the preview module 112 can operate to display the current view, the capability of the image capture module 114 refers to the manner in which the image capture module 114 can operate to capture images, and the capability of the video record module 116 refers to the manner in which the video record module 116 can operate to capture video. The capabilities of a module 112, 114, or 116 can vary based on the desires of the developer of the module, the speed or quality of the components of the module, and so forth.

Table I illustrates example capabilities of the preview module 112. It should be noted that the capabilities described in Table I are only examples, and that the preview module 112 can have various other capabilities that are not described in Table I. Similarly, the preview module 112 need not have all of the capabilities described in Table I.

TABLE I

| Capability | Description |
|---|---|
| Resolution | A resolution at which the current view is displayed, such as 4K, 1080p, 720p, or 360p. |
| Frame rate | A rate at which frames of the current view are displayed, such as 60 frames per second (fps), 30 fps, or 24 fps. |
| Filtering | What of multiple filters are applied to the current view being displayed, such as converting the current view to a sepia or grayscale display. |

Table II illustrates example capabilities of the image capture module 114. It should be noted that the capabilities described in Table II are only examples, and that the image capture module 114 can have various other capabilities that are not described in Table II. Similarly, the image capture module 114 need not have all of the capabilities described in Table II.

TABLE II

| Capability | Description |
|---|---|
| Image Resolution | A resolution at which images are captured, such as 41 megapixels, 20 megapixels, 12 megapixels, 8 megapixels, 4 megapixels, or 2 megapixels. |
| Capture Rate | A rate at which images can be captured, such as 8 images per second, 5 images per second, or 1 image per second. |
| Face Detection | Whether face detection is supported when capturing images. |
| Video Stabilization | Whether video stabilization is supported when capturing images. |
| Variable Photo Sequence | Whether capturing variable photo sequences (e.g., a series of images each captured with different settings such as focus, ISO, exposure, exposure compensation) is supported when capturing images. |
| Photo HDR | Whether image capture using HDR (high dynamic range imaging) is supported. |

Table III illustrates example capabilities of the video record module 116. It should be noted that the capabilities described in Table III are only examples, and that the video record module 116 can have various other capabilities that are not described in Table III. Similarly, the video record module 116 need not have all of the capabilities described in Table III.

TABLE III

| Capability | Description |
|---|---|
| Video Resolution | A resolution at which the video is recorded, such as 4K, 1080p, 720p, or 360p. |
| Video Frame rate | A rate at which frames are recorded, such as 60 fps, 30 fps, or 24 fps. |
| Face Detection | Whether face detection is supported when recording video. |
| Video Stabilization | Whether video stabilization is supported when recording video. |
| Video HDR | Whether video HDR is supported. |

The modules 112-116 support various different capabilities, but the camera system 108 (and thus the computing device 100) may not be configured to use all of these supported capabilities concurrently. This can be due to, for example, the processing capabilities of the particular software and/or hardware used to implement the modules 112-116, the processing capabilities of other software and/or hardware of the computing device, and so forth. For example, the preview module 112 may support displaying a scene currently being viewed by the camera system at 4K resolution at 30 fps, the video record module 116 may support video recording at 4K resolution at 30 fps, and the image capture module 114 may support capturing 41 megapixel images at a rate of 5 images per second. However, the computing device 100 may not support all of these capabilities concurrently. For example, given the camera hardware 118 the computing device 100 may support video recording and image capture concurrently, but support the video record module 116 recording video at 4K resolution at 30 fps only if the image capture module 114 is capturing images at 12 megapixel resolution or less. By way of another example, given the camera hardware 118 the computing device 100 may support video recording and image capture concurrently, but support the image capture module 114 capturing 41 megapixel images at a rate of 5 images per second only if the video record module 116 is recording video at 720p resolution or less.

The camera system 108 is associated with the camera profile record 122, which includes multiple profiles to facilitate identifying which capabilities of the camera system 108 can be used concurrently. The camera profile record 122 can be maintained on a storage device (e.g., Flash memory or magnetic disk of the computing device 100), or alternatively be maintained in other memory of the computing device (e.g., the camera profile record 122 may be included as part of a camera system driver that is loaded into random access memory of the computing device 100). Each profile in the camera profile record 122 identifies multiple capabilities of the camera system 108 that can be used concurrently (also referred to as capabilities of the camera system 108 that the computing device 100 is configured to use concurrently). The interface module 120 operates as an interface between the camera system 108 and the program 106, receiving requests to use capabilities of the camera system 108 from the program 106, and providing profiles from the camera profile record 122 to the program 106, allowing the program 106 to readily determine which capabilities of the camera system 108 can be used concurrently.

Figure 2:
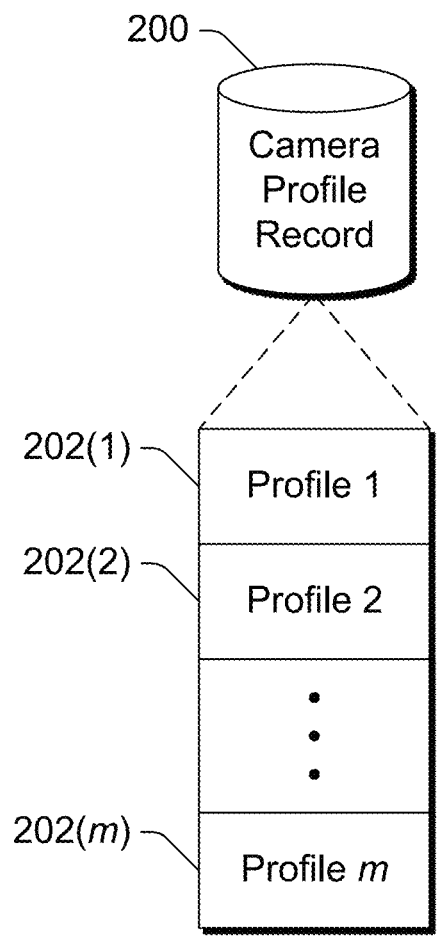
FIG. 2 illustrates an example camera profile record in accordance with one or more embodiments.

FIG. 2 illustrates an example camera profile record 200 in accordance with one or more embodiments. The camera profile record 200 can be, for example, the camera profile record 122 of FIG. 1. The camera profile record 200 includes multiple (m) profiles 202, each profile 202 identifying which capabilities of the camera system 108 can be used concurrently. Which capabilities of the camera system 108 can be used concurrently can be determined by a vendor or designer of the camera system 108, and/or can be determined automatically (e.g., by a separate device or module attempting to use different combinations of capabilities concurrently and determining whether such attempts are successful).

By way of example, assume that the profiles 202 include only three profiles: a profile 202(1), a profile 202(2), and a profile 202(3). The profile 202(1) includes one combination of capabilities that the computing device is configured to use concurrently, such as display of the current view by the preview module 112 at 4K resolution (or less) at 30 fps, recording of video by the video record module 116 at 4K resolution (or less) at 30 fps, but no image capture by the image capture module 114. The profile 202(2) includes another combination of capabilities that the computing device is configured to use concurrently, such as display of the current view by the preview module 112 at 720p resolution (or less) at 30 fps, no recording of video by the video record module 116, and image capture by the image capture module 114 at a resolution of 41 megapixels (or less) and a rate of 5 images per second. The profile 202(3) includes another combination of capabilities that the computing device is configured to use concurrently, such as display of the current view by the preview module 112 at 720p resolution (or less) at 30 fps, recording of video by the video record module 116 at 720p resolution (or less) at 30 fps, and image capture by the image capture module 114 at a resolution of 2 megapixels (or less).

Continuing with this example, these three profiles 202(1), 202(2), and 202(3) are provided to the program 106. The program 106 can then readily determine, based on these profiles, that if image capture at 41 megapixels is desired, the camera system 108 can display the current view by the preview module 112 but no video recording can be performed. The program 106 can also readily determine, based on these profiles, that if image capture, video recording, and current view display are all desired, then the camera system 108 is limited to playing back the current view at no more than 720p resolution at 30 fps, recording of the video at not more than 720p resolution at 30 fps, and capturing images at a resolution of no more than 2 megapixels.

In one or more embodiments, a set of typical user scenarios can be identified and for each typical user scenario one of the profiles 202 can be flagged or otherwise identified as being associated with that typical user scenario. A profile 202 can be flagged or otherwise identified as being associated with a typical user scenario in various manners, such as by a particular value or indicator included as part of the profile, in a table mapping identifiers of profiles to typical user scenarios, and so forth. Various different typical user scenarios can be identified, such as: Video Recording, High Quality Photo, Balanced Video and Photo, Video Conferencing, and Photo Sequence. The Video Recording user scenario refers to situations in which video recording is most important and other capabilities need not be supported. The High Quality Photo user scenario refers to situations in which capturing high quality image is most important and other capabilities need not be supported. The Balanced Video and Photo user scenario refers to situations in which concurrent video recording and image capture is most important, and are both to be supported. The Video Conferencing user scenario refers to situations in which capturing images and/or recording video for transmission to another computing device during a video conference is most important, and is to be supported. The Photo Sequence user scenario refers to situations in which capturing a series of photos quickly is most important and other capabilities need not be supported.

A particular one of the profiles 202 can be flagged or otherwise identified as associated with each of these different scenarios. Which profiles are flagged or otherwise identified with which profiles 202 can be determined by a vendor or designer of the camera system 108, and/or can be determined automatically (e.g., by a separate device or module attempting to use different combinations of capabilities in different user scenarios determining which perform better (e.g., faster, with a higher resolution, etc.)).

By way of example, a profile 202 having a combination of both video recording capability and preview capability can be flagged or otherwise associated with the Video Recording user scenario. By way of another example, a profile 202 having the highest resolution image capture capability can be flagged or otherwise associated with the High Quality Photo user scenario. By way of another example, a profile 202 having both video recording and image capture capabilities can be flagged or otherwise associated with the Balanced Video and Photo user scenario. By way of another example, a profile 202 having a low resolution image capture capability and a low resolution video recording capability (resulting in lower power usage and lower latency when transmitting video or images to another computing device) can be flagged or otherwise associated with the Video Conferencing user scenario. By way of another example, a profile 202 having the highest image capture capability can be flagged or otherwise associated with the High Quality Photo user scenario. By way of another example, a profile 202 having the highest image captures per second rate can be flagged or otherwise associated with the Photo Sequence user scenario.

Supporting these different user scenarios simplifies development of the program 106 by alleviating the program 106 of the need to determine what combination of capabilities is desired by the program 106. For example, if the program 106 is to establish a video conference connection with another computing device, the program 106 can simply select the profile associated with the Video Conferencing user scenario and need not be concerned with what resolutions of video recording and/or image capture are used. By way of another example, if the program 106 desires to capture images and record video concurrently, the program 106 can simply select the profile associated with the Balanced Video and Photo user scenario and need not be concerned with what resolutions of video recording and/or image capture are used.

Returning to FIG. 1, although the computing device 100 is illustrated as having a single camera system, situations can arise in which the computing device 100 includes multiple camera systems. These camera systems can each include camera hardware with a lens pointing in different directions, or alternatively each include camera hardware with a lens pointing in substantially the same direction (e.g., within a threshold number of degrees, such as 5 degrees, of the same direction). Each camera system can have the same or different capabilities, and each camera system in a computing device has a corresponding camera profile record and corresponding profiles. Each camera system has its own camera profile record and corresponding profiles, although camera profiles may identify camera profiles of other camera systems as discussed in more detail below.

In one or more embodiments, each camera system in the computing device 100 has the same capabilities, and is able to capture images, record video, and display preview data at the same resolutions. Alternatively, different camera systems in the computing device 100 can have different capabilities, each being able to perform some combination of capturing images, recording video, and/or displaying the current view at different resolutions. Additionally, different camera systems can have image sensors that operate in the same or different manners. For example, one camera system can have an image sensor that senses light in the visual spectrum, and another camera system can have an image sensor that senses light in the infrared (IR) spectrum.

Figure 3:
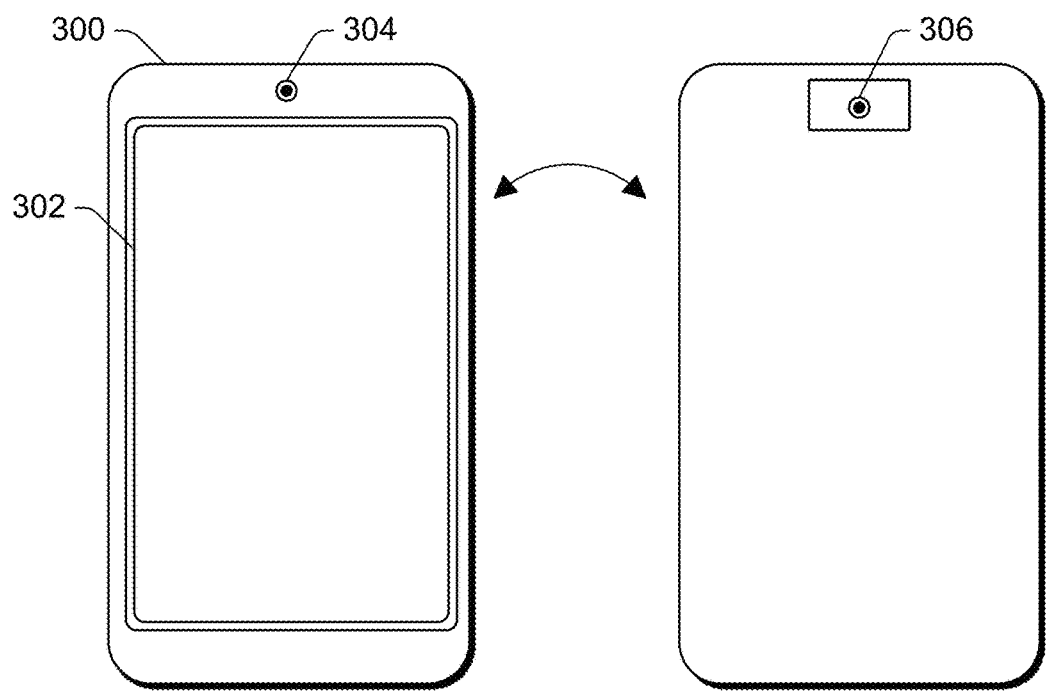
FIG. 3 illustrates an example computing device having multiple camera systems in accordance with one or more embodiments.

FIG. 3 illustrates an example computing device 300 having multiple camera systems in accordance with one or more embodiments. The computing device 300 has one side (e.g., a front side) with a display screen 302 and a camera system with a front facing lens 304. The computing device has another side (e.g. a rear side) with a rear facing lens 306.

Figure 4:
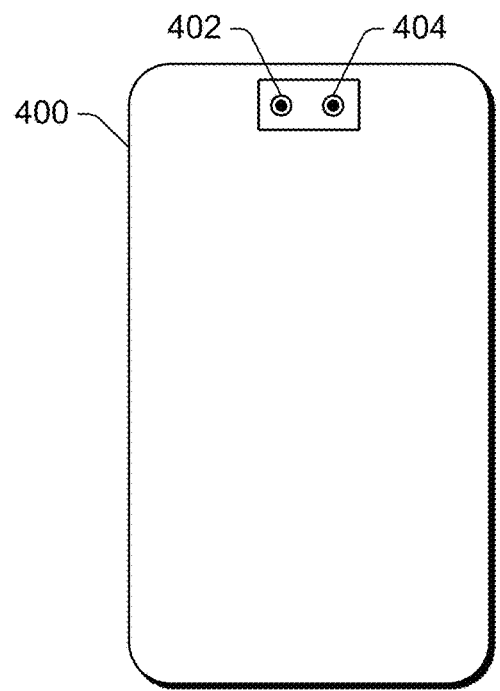
FIG. 4 illustrates another example computing device having multiple camera systems in accordance with one or more embodiments.

FIG. 4 illustrates an example computing device 400 having multiple camera systems in accordance with one or more embodiments. The computing device 400 has a side (e.g., a rear side) with two different rear facing lenses: lens 402 and lens 404.

In situations in which a computing device has multiple camera systems, each camera system has a camera profile record (e.g., analogous to camera profile record 200 of FIG. 2). Additionally, each profile for one camera system of the computing device can identify one or more additional profiles for another camera system of the computing device, these one or more additional profiles identifying one or more capabilities of the other camera system that the computing device is configured to use concurrently, and configured to use concurrently with the one or more capabilities of the one camera system.

Figure 5:
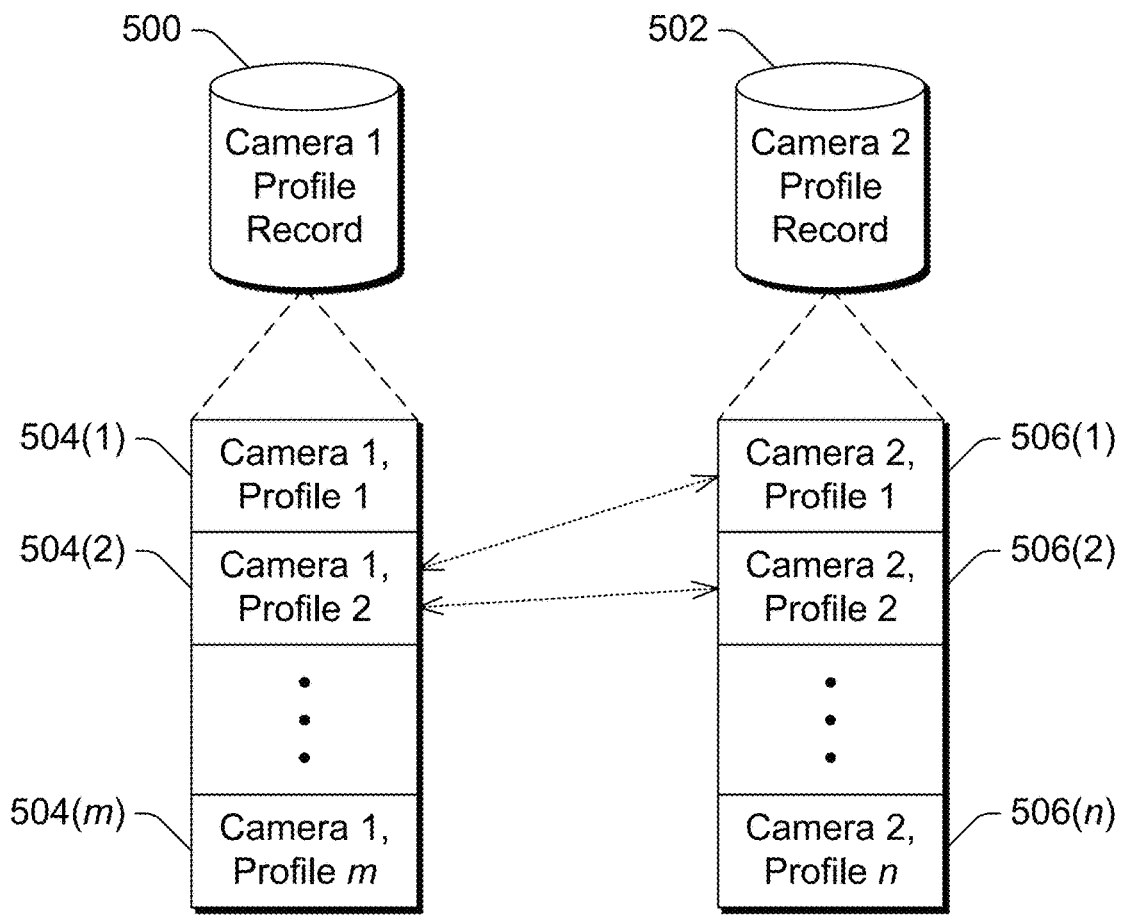
FIG. 5 illustrates example camera profile records of different camera systems in accordance with one or more embodiments.

FIG. 5 illustrates example camera profile records of different camera systems in accordance with one or more embodiments. Camera profile records 500 and 502 are illustrated, each of which can be a camera profile record analogous to the camera profile record 122 of FIG. 1. The camera profile record 500 is a camera profile record for a first camera system of a computing device, and the camera profile record 502 is a camera profile record for a second camera system of the computing device. The camera profile record 500 includes multiple (m) profiles 504, each profile 504 identifying which capabilities of a first camera system of the computing device that the computing device is configured to use concurrently. Which capabilities of the first camera system can be used concurrently can be determined by a vendor or designer of the first camera system, and/or can be determined automatically as discussed above. The camera profile record 502 includes multiple (n) profiles 506, each profile 506 identifying which capabilities of a second camera system of the computing device that the computing device is configured to use concurrently. Which capabilities of the second camera system can be used concurrently can be determined by a vendor or designer of the second camera system, and/or can be determined automatically as discussed above.

Each profile 504 optionally includes an identifier of (e.g., a pointer to) one or more profiles 506 that the computing device is configured to use concurrently with the capabilities of that profile 504. Similarly, each of the profiles 506 optionally includes an identifier of (e.g., a pointer to) one or more profiles 504 that the computing device is configured to use concurrently with the capabilities of that profile 506. For example, assuming that the computing device is configured to concurrently use the capabilities of the second camera system indicated in the profile 506(1) with the capabilities of the first camera system indicated in the profile 504(2), then the profile 504(2) include an identifier of the profile 506(1), and the profile 506(1) includes an identifier of the profile 504(2), illustrated by a dashed arrow in FIG. 5. Similarly, assuming that the computing device is configured to concurrently use the capabilities of the second camera system indicated in the profile 506(2) with the capabilities of the first camera system indicated in the profile 504(2), then the profile 504(2) includes an identifier of the profile 506(2), and the profile 506(2) includes an identifier of the profile 504(2), illustrated by a dashed arrow in FIG. 5. Thus, if a program desires to use capabilities of the two camera systems concurrently, and desires to use particular capabilities of the first camera system, given the profiles 504 in the camera profile record 500 (and any profiles 506 that are pointed to or otherwise identified by the profiles 504) the program can readily determine which capabilities of the second camera system can be used concurrently with those particular capabilities of the first camera system. Similarly, if a program desires to use capabilities of the two camera systems concurrently, and desires to use particular capabilities of the second camera system, given the profiles 506 in the camera profile record 502 (and any profiles 504 that are pointed to or otherwise identified by the profiles 506) the program can readily determine which capabilities of the first camera system can be used concurrently with those particular capabilities of the second camera system.

By way of example, assume that the profile 504(2) includes a combination of capabilities that can be used concurrently, such as display of the current view by a preview module of the first camera system at 720p resolution (or less) at 30 fps, recording of video by a video record module of the first camera system at 720p resolution (or less) at 30 fps, and image capture by an image capture module of the first camera system at a resolution of 2 megapixels (or less). Profiles 506(1) and 506(2) each include a different combination of capabilities of the second camera system that the computing device is configured to use concurrently with the capabilities of the first camera system identified in the profile 504(2). E.g., the profile 506(1) can include a combination of capabilities of the second camera system that the computing device is configured to use concurrently with the capabilities of the first camera system identified in the profile 504(2), such as display of the current view by a preview module of the second camera system at 360p resolution (or less) at 30 fps, recording of video by a video record module of the second camera system at 360p resolution (or less) at 30 fps, and no image capture by an image capture module of the second camera system. Thus, a program of the computing device can readily determine, given profiles 504(2) and 506(1), that the computing device is configured to record video by both of the camera systems concurrently at 360p at 30 fps, but not record video by both of the camera systems concurrently at 720p at 30 fps.

In the discussions above, reference is made to a set of typical user scenarios that can be identified and for each typical user scenario one of the profiles can be flagged or otherwise identified as being associated with that typical user scenario. This flagging or otherwise identifying can include flagging or otherwise identifying profiles of other camera systems as well. For example, the profile 504(2) and the profile 506(1) can both be flagged or otherwise associated with a particular user scenario.

In the discussion of FIG. 5, reference is made to two camera systems. However, it should be noted that analogous techniques can be applied to any number of camera systems. Each profile in a camera profile record can point to or otherwise identify one or more profiles of each of one or more other camera systems in the computing device, indicating which capabilities of the one or more other camera systems the computing device is configured to use concurrently with the capabilities identified in the profile. For example, the computing device may include a third camera system, and one or more of the profiles 504 can identify profiles of the third camera system identifying which capabilities of the third camera system of the computing device that the computing device is configured to use concurrently for the third camera system, as well as use concurrently with capabilities identified in an identified one of the profiles 504 (and optionally in an identified one of the profiles 506).

Returning to FIG. 1, the interface module 120 provides the profiles for the camera system 108 to the program 106. The program 106 can use these different profiles to display or otherwise present, as user selectable capabilities of the camera system, ones of the capabilities that can be used together. If the computing device is not configured to use two capabilities together, then the program 106 does not present those two capabilities as user selectable capabilities of the camera system. These user selectable capabilities of the camera system refer to capabilities of the camera system that the user can select to use (e.g., concurrently record video and capture an image). The capabilities can be displayed or otherwise presented in a variety of different manners, such as using different icons or buttons on a display device, using menu or other list items, and so forth.

In one or more embodiments, the interface module 120 also enforces the combinations of capabilities identified in the profiles of the camera profile record 122. In such embodiments, if a request is received from the program 106 to use multiple capabilities of the camera system 108 concurrently, the interface module 120 checks the profiles of the camera profile record 122 to verify that there is a profile that indicates the requested multiple capabilities can be used together. If such a profile is present in the camera profile record 122, then the interface module 120 allows the modules 112-116 to perform the request; however, if no such profile exists, then an appropriate remedial action is taken (e.g., an indication is returned to the program 106 that the request is denied).

The program 106 can request a particular combination of capabilities of one or more camera systems be used in a variety of different manners. For example, the program 106 can specify individual capabilities that the program 106 desires to use (e.g., record video at 1080p at 30 fps concurrently with displaying the current view as well as capturing images at a 12 megapixel resolution). By way of another example, the program 106 can specify a particular user scenario (e.g., the Balanced Video and Photo scenario). By way of another example, the program 106 can specify a particular profile for each of one or more camera systems (e.g., camera profile 202(2) of FIG. 2, which inherently specify the default capabilities identified camera profile 202(2)).

Figure 6:
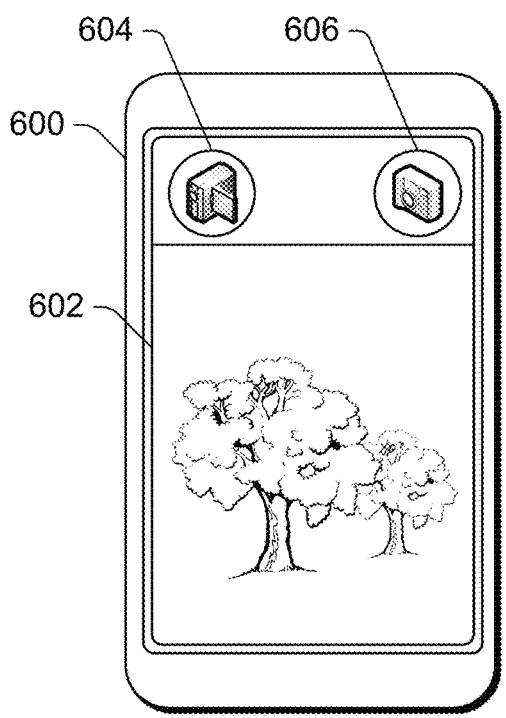

FIGS. 6-11 illustrate examples of different manners in which a program can use the profiles to present, as user selectable capabilities of the camera system, ones of the capabilities that can be used together in accordance with one or more embodiments. FIG. 6 illustrates an example computing device 600 with a display screen 602. Current settings for the program (e.g., default settings, settings provided by a user of the computing device 600, settings received from another program or device, etc.) identify capabilities of the camera system of the computing device 600 including video recording, current view display, and image capture that the computing device 600 is configured to use concurrently (based on the profiles of the camera system). Accordingly, a user selectable button 604 is displayed indicating recording of video can be selected by the user and a user selectable button 606 is displayed indicating capturing of an image (taking a photograph) can be selected by the user. A current view of the camera system is also displayed on the display screen 602.

Figure 7:
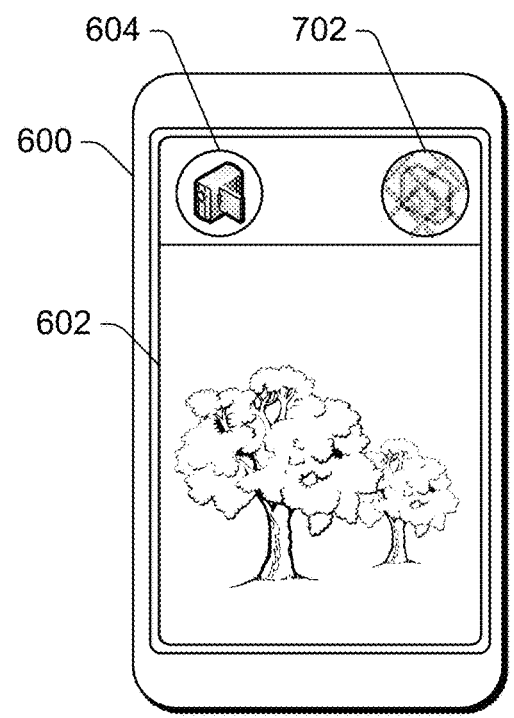

FIG. 7 illustrates an example computing device 600 with a display screen 602. Current settings for the program (e.g., default settings, settings provided by a user of the computing device 600, settings received from another program or device, etc.) identify capabilities of the camera system of the computing device 600 including video recording and current view display that the computing device 600 is configured to use concurrently, but not use concurrently with image capture (based on the profiles of the camera system). Accordingly, a user selectable button 604 is displayed indicating recording of video can be selected by the user, and a button 702 is displayed as shadowed (e.g., illustrated by cross-hatching in FIG. 7) to indicate that capturing of an image (taking a photograph) cannot be selected by the user. A current view of the camera system is also displayed on the display screen 602.

Figure 8:
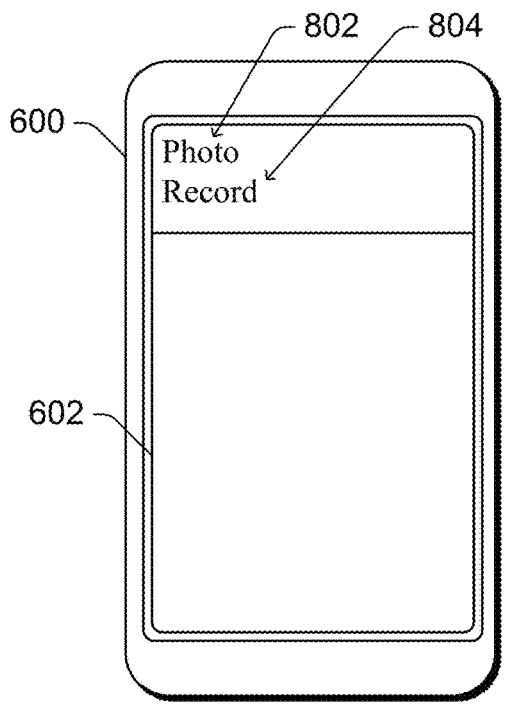

FIG. 8 illustrates an example computing device 600 with a display screen 602. Current settings for the program (e.g., default settings, settings provided by a user of the computing device 600, settings received from another program or device, etc.) identify capabilities of the camera system of the computing device 600 including video recording and image capture that the computing device 600 is configured to use concurrently, but not use concurrently with current view display (based on the profiles of the camera system). Accordingly, a user selectable word or link 802 is displayed indicating capturing of an image (taking a photograph) can be selected by the user, and a user selectable word or link 804 is displayed indicating recording of video can be selected by the user. However, no current view is displayed on the display screen 602.

Figure 9:
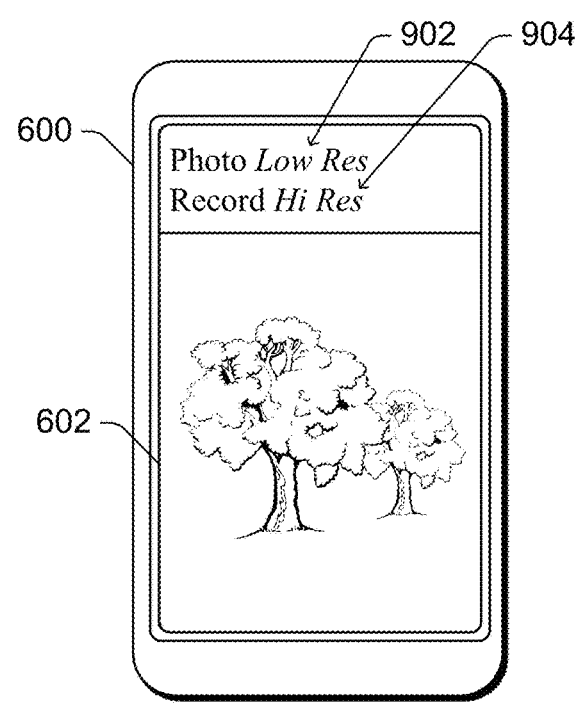

FIG. 9 illustrates an example computing device 600 with a display screen 602. Current settings for the program (e.g., default settings, settings provided by a user of the computing device 600, settings received from another program or device, etc.) identify capabilities of the camera system of the computing device 600 including video recording, current view display, and image capture that the computing device 600 is configured to use concurrently (based on the profiles of the camera system). Accordingly, a user selectable word or link 902 is displayed indicating capturing of an image (taking a photograph) can be selected by the user as well as the resolution at which the image is captured. A user selectable word or link 904 is displayed indicating recording of video can be selected by the user as well as the resolution at which the video is recorded. A current view is automatically displayed on the display screen 602.

FIG. 10 illustrates an example computing device 1000 with a display screen 1002. The computing device 1000 includes multiple camera systems. Current settings for the program (e.g., default settings, settings provided by a user of the computing device 1000, settings received from another program or device, etc.) identify capabilities of the camera systems of the computing device 1000 including video recording, current view display, and image capture that the computing device 1000 is configured to use concurrently (based on the profiles of the camera systems). Accordingly, user selectable words or links 1004 are displayed indicating capturing of an image (taking a photograph) and/or recording of video by a first camera system of the two camera systems can be selected by the user. User selectable words or links 1006 are displayed indicating capturing of an image (taking a photograph) and/or recording of video by a second camera system of the two camera systems can be selected by the user. A current view of one of the two camera systems is automatically played back and displayed on the display screen 1002.

FIG. 11 illustrates an example computing device 1000 with a display screen 1002. The computing device 1000 includes multiple camera systems. Current settings for the program (e.g., default settings, settings provided by a user of the computing device 1000, settings received from another program or device, etc.) identify capabilities of the camera systems of the computing device 1000 that the computing device 1000 is configured to use concurrently are video recording and image capturing in a high resolution by a first camera system of the computing device, and video recording in a low (standard) resolution by a second camera system of the computing device (based on the profiles of the camera systems). Accordingly, user selectable words or links 1102 are displayed indicating capturing of an image (taking a photograph) at a high resolution (e.g., high definition, also referred to as HD) and/or recording of video at a high resolution by a first camera system of the two camera systems can be selected by the user. User selectable words or links 1104 are displayed indicating recording of video at a low resolution (e.g., a low or standard definition, also referred to as SD) by a second camera system of the two camera systems can be selected by the user. No current view of either camera system is displayed on the display screen 1002.

Figure 12:
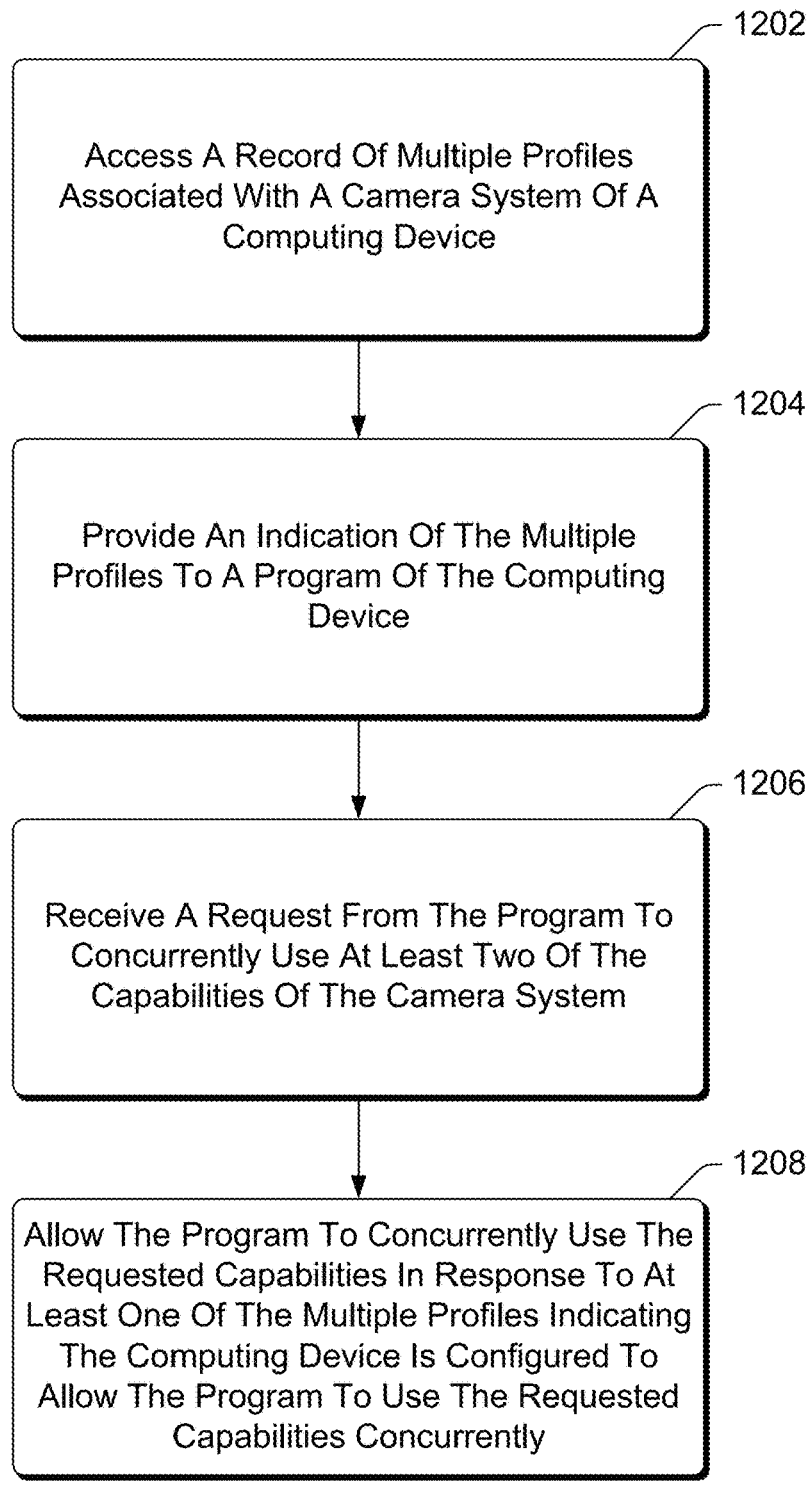
FIG. 12 is a flowchart illustrating an example process for improving usability of a device using the profiles identifying camera capabilities that are usable concurrently in accordance with one or more embodiments.

FIG. 12 is a flowchart illustrating an example process 1200 for improving usability of a device using the profiles identifying camera capabilities that are usable concurrently in accordance with one or more embodiments. Process 1200 is carried out by a device, such as computing device 100 of FIG. 1 or any other computing device discussed herein, and can be implemented in software, firmware, hardware, or combinations thereof. Process 1200 is shown as a set of acts and is not limited to the order shown for performing the operations of the various acts. Process 1200 is an example process for improving usability of a device using the profiles identifying camera capabilities that are usable concurrently; additional discussions of improving usability of a device using the profiles identifying camera capabilities that are usable concurrently are included herein with reference to different figures.

In process 1200, a record of multiple profiles associated with a camera system of a computing device is accessed (act 1202). Each profile of the multiple profiles identifies multiple, different capabilities of the camera system that the computing device is configured to use concurrently, as discussed above. Various different capabilities can be identified, such as any combination of the capabilities discussed above in Table I, Table II, and/or Table III.

An indication of the multiple profiles are provided to a program of the computing device (act 1204). The indication can be, for example, the multiple profiles or an indication in a storage device where the multiple profiles are stored.

A request to concurrently use at least two of the capabilities of the camera system is received from the program (act 1206). For example, a request to capture an image concurrently with recording video can be received.

The program is allowed to concurrently use the at least two capabilities of the camera system in response to at least one of the multiple profiles indicating the computing device is configured to allow the program to use the requested capabilities concurrently (act 1208). However, if none of the multiple profiles indicates that the computing device is configured to use the requested at least two capabilities concurrently, then the programs is not allowed to use the requested capabilities concurrently.

Figure 13:
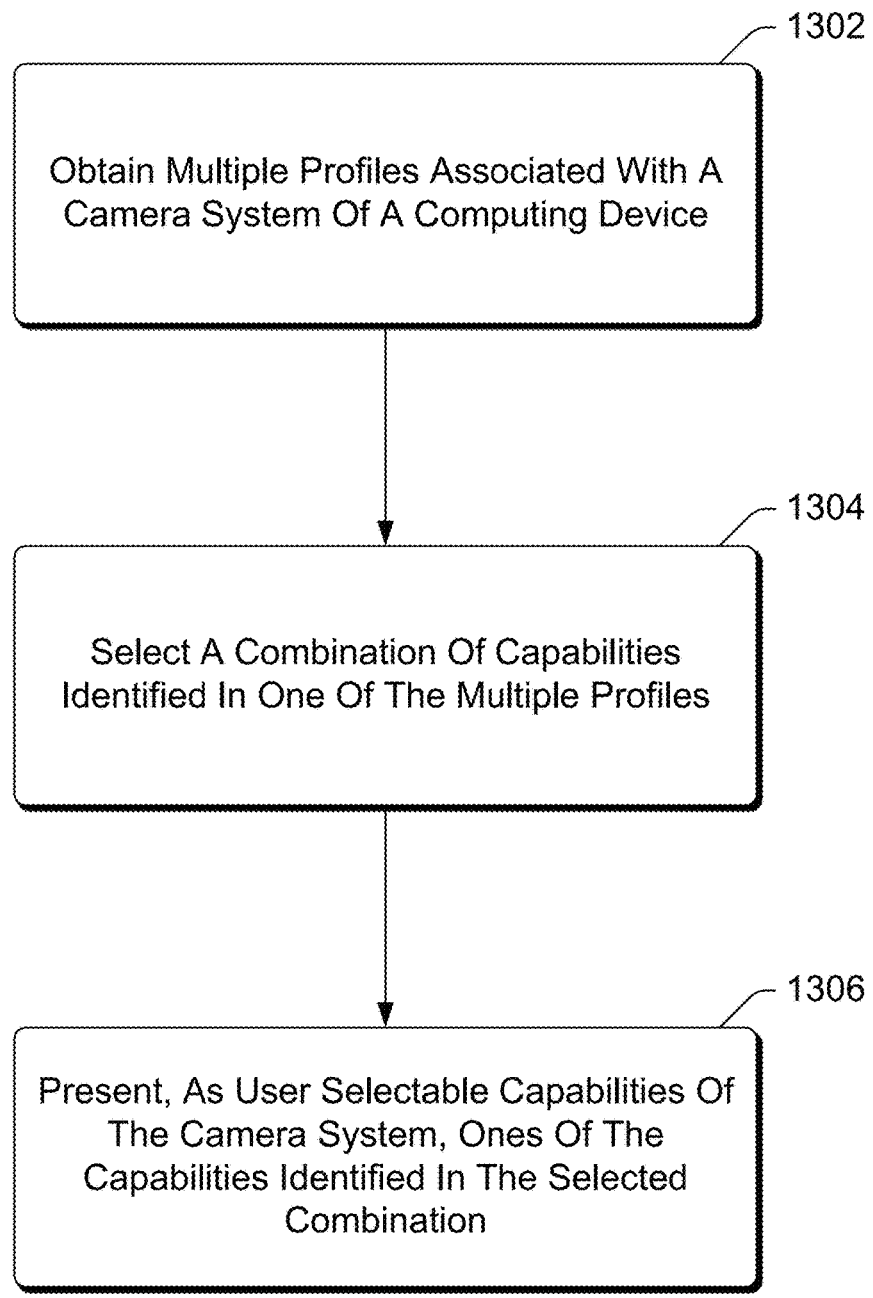
FIG. 13 is a flowchart illustrating another example process for improving usability of a device using the profiles identifying camera capabilities that are usable concurrently in accordance with one or more embodiments.

FIG. 13 is a flowchart illustrating another example process 1300 for improving usability of a device using the profiles identifying camera capabilities that are usable concurrently in accordance with one or more embodiments. Process 1300 is carried out by a device, such as computing device 100 of FIG. 1 or any other computing device discussed herein, and can be implemented in software, firmware, hardware, or combinations thereof. Process 1300 is shown as a set of acts and is not limited to the order shown for performing the operations of the various acts. Process 1300 is an example process for improving usability of a device using the profiles identifying camera capabilities that are usable concurrently; additional discussions of improving usability of a device using the profiles identifying camera capabilities that are usable concurrently are included herein with reference to different figures.

In process 1300, multiple profiles associated with a camera system of a computing device are obtained (act 1302).

Each profile of the multiple profiles identifies multiple, different capabilities of the camera system that the computing device is configured to use concurrently as discussed above.

A combination of capabilities identified in one of the multiple profiles is selected (act 1304). The selection can be made in a variety of different manners, such as in response to user specified configuration settings (e.g., indicating desired resolutions for image capture or video recording, indicating whether image stabilization during video recording is desired, etc.), default configuration settings (e.g., indicating lower resolution images or video are to be used to conserve storage space or power, indicating face detection can be performed when capturing images to improve focusing, etc.), and so forth.

Ones of the capabilities identified in the selected combination are displayed or otherwise presented as user selectable capabilities of the camera system (act 1306). The user selectable capabilities can be displayed or otherwise presented in various manners as discussed above, such as using buttons, icons, words or links, menu items, and so forth. The user selectable capabilities presented in act 1306 can be all of the capabilities indicated in the one of the multiple profiles identified in act 1304, or alternatively a subset (e.g., as desired by the program or a user of the program) of the capabilities indicated in the one of the multiple profiles identified in act 1304. One or more requests to perform user selected capabilities can be provided to the camera system, which carries out the requests. For example, image capture is performed in response to user selection of an image capture button, video recording is performed in response to user selection of a video record button, and so forth.

In the discussions herein, various different capabilities of camera systems are discussed. It should be noted that these different capabilities are examples, and that various other capabilities can be identified in profiles of a camera system. In one or more embodiments, these other capabilities refer to additional data or information available from other camera systems. For example, an additional camera system may be included in a computing device to facilitate focusing by a camera system, to facilitate determining depth of field of a scene being captured, and so forth.

It should also be noted that different capabilities in a profile can include capabilities leveraged or otherwise used by the camera system even if not provided by the camera system itself. Other programs, such as an operating system of the computing device that includes the camera system, can provide some capabilities (e.g., image stabilization) that can be included in a profile of the camera system. This allows, for example, the camera system to use a capability of another program (e.g., image stabilization) in certain situations (e.g., in which the camera system runs fast enough that the other program can be used).

It should also be noted that a profile for a camera system can identify one or more default capabilities for the profile. These default capabilities can be determined by a vendor or designer of the camera system. For example, a profile may indicate a capability of capturing images at 20 megapixels resolution or less, and identify capturing images at 12 megapixels as the default capability for capturing images. By way of another example, a profile may indicate a capability of recording video at 1080p resolution or less, and identify recording video at 1080p resolution as the default capability for recording video. These default capabilities can also vary based on capabilities of the computing device, such as default capabilities of higher resolution or frame rates for more powerful (e.g., greater than a threshold processor speed) computing devices and lower resolution or frame rates for less powerful (e.g., not greater than a threshold processor speed) computing devices. In response to a request from a program to use a particular profile, without the program specifying which specific capabilities of the particular profile to use, the camera system uses the default capabilities for the particular profile.

It should also be noted that the techniques discussed herein allow a camera system to identify or advertise various different combinations of capabilities of the camera system that can be used concurrently. The camera system is not relegated to identifying to a program only a lowest common capability (e.g., frame rate, resolution, etc.) that is always usable; rather, the camera system can identify various different combinations of capabilities to the program.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 14:
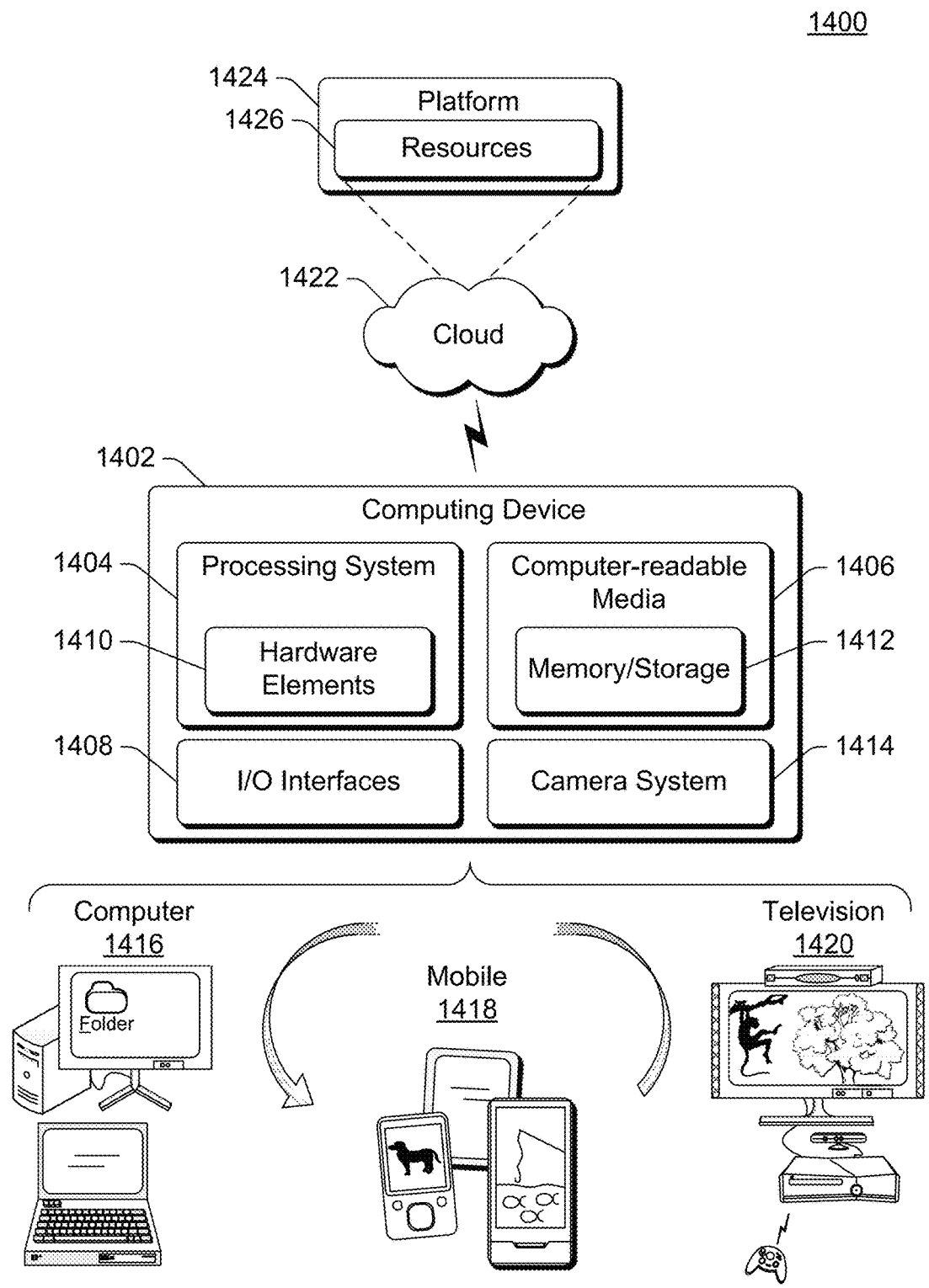
FIG. 14 illustrates an example system that includes an example computing device that is representative of one or more systems and/or devices that may implement the various techniques described herein.

FIG. 14 illustrates an example system generally at 1400 that includes an example computing device 1402 that is representative of one or more systems and/or devices that may implement the various techniques described herein. The computing device 1402 may be, for example, a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O Interfaces 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware elements 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1406 is illustrated as including memory/storage 1412. The memory/storage 1412 represents memory/storage capacity associated with one or more computer-readable media. The memory/storage 1412 may include volatile media (such as random access memory (RAM)) and/or nonvolatile media (such as read only memory (ROM), Flash memory, optical disks, magnetic disks, and so forth). The memory/storage 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

The one or more input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1402 may be configured in a variety of ways as further described below to support user interaction.

The computing device 1402 also includes a camera system 1414. The camera system 1414 provides various different capabilities such as video recording, image capture, current view display, and so forth as discussed above. The camera system 1414 can implement, for example, the camera system 108 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 1410 and computer-readable media 1406 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of modules as a module that is executable by the computing device 1402 as software may be achieved at least partially in hardware, e.g., through use of computer-readable storage media and/or hardware elements 1410 of the processing system. The instructions and/or functions may be executable/operable by one or more articles of manufacture (for example, one or more computing devices 1402 and/or processing systems 1404) to implement techniques, modules, and examples described herein.

As further illustrated in FIG. 14, the example system 1400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1400, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 1402 may assume a variety of different configurations, such as for computer 1416, mobile 1418, and television 1420 uses. Each of these configurations includes devices that may have generally different constructs and capabilities, and thus the computing device 1402 may be configured according to one or more of the different device classes. For instance, the computing device 1402 may be implemented as the computer 1416 class of a device that includes a personal computer, desktop computer, a multi-screen computer, laptop computer, netbook, and so on.

The computing device 1402 may also be implemented as the mobile 1418 class of device that includes mobile devices, such as a mobile phone, portable music player, portable gaming device, a tablet computer, a multi-screen computer, and so on. The computing device 1402 may also be implemented as the television 1420 class of device that includes devices having or connected to generally larger screens in casual viewing environments. These devices include televisions, set-top boxes, gaming consoles, and so on.

The techniques described herein may be supported by these various configurations of the computing device 1402 and are not limited to the specific examples of the techniques described herein. This functionality may also be implemented all or in part through use of a distributed system, such as over a "cloud" 1422 via a platform 1424 as described below.

The cloud 1422 includes and/or is representative of a platform 1424 for resources 1426. The platform 1424 abstracts underlying functionality of hardware (e.g., servers) and software resources of the cloud 1422. The resources 1426 may include applications and/or data that can be utilized while computer processing is executed on servers that are remote from the computing device 1402. Resources 1426 can also include services provided over the Internet and/or through a subscriber network, such as a cellular or Wi-Fi network.

The platform 1424 may abstract resources and functions to connect the computing device 1402 with other computing devices. The platform 1424 may also serve to abstract scaling of resources to provide a corresponding level of scale to encountered demand for the resources 1426 that are implemented via the platform 1424. Accordingly, in an interconnected device embodiment, implementation of functionality described herein may be distributed throughout the system 1400. For example, the functionality may be implemented in part on the computing device 1402 as well as via the platform 1424 that abstracts the functionality of the cloud 1422.

In the discussions herein, various different embodiments are described. It is to be appreciated and understood that each embodiment described herein can be used on its own or in connection with one or more other embodiments described herein.

A method comprising: accessing, by a first camera system of a computing device, a record of multiple profiles associated with the first camera system, each profile of the multiple profiles identifying multiple, different capabilities of the first camera system that the computing device is configured to use concurrently; providing an indication of the multiple profiles to a program of the computing device to allow the program to know which capabilities of the first camera system the computing device is configured to use concurrently; receiving from the program a request to concurrently use at least two of the capabilities of the first camera system; and allowing the program to concurrently use the at least two capabilities in response to at least one of the multiple profiles indicating the computing device is configured to allow the program to use the at least two capabilities concurrently.

Alternatively or in addition to any of the above described methods, any one or combination of: the multiple, different capabilities of the first camera system comprising two or more capabilities selected from the group including: recording video at one or more resolutions, capturing images at one or more resolutions, and displaying a current view of the first camera system at one or more resolutions; the multiple, different capabilities of the first camera system including capturing images at one or more resolutions as well as at least one capability selected from the grouping including: whether face detection is supported when capturing images, whether video stabilization is supported when capturing images, whether capturing variable photo sequences is supported, and whether image capture using high dynamic range imaging is supported; the multiple, different capabilities of the first camera system including recording video at one or more resolutions as well as at least one capability selected from the grouping including: whether face detection is supported when recording video, whether video stabilization is supported when recording video, and whether video high dynamic range imaging is supported; one of the multiple profiles associated with the first camera system being identified as associated with one of multiple user scenarios, and allowing the program to select capabilities of the first camera system by selection of the one of the multiple profiles associated with the first camera system; for one of the multiple profiles associated with the first camera system, the profile including an identifier of at least one profile of multiple profiles associated with a second camera system of the computing device, each identified profile of the multiple profiles associated with the second camera system identifying multiple, different capabilities of the second camera system that the computing device is configured to use concurrently with the capabilities in the one profile of the first camera system, the method further comprising: providing an indication of the identified profiles associated with the second camera system to the program; receiving from the program a request to use at least one of the capabilities of the second camera system concurrently with the at least two of the capabilities of the first camera system; and allowing the program to concurrently use the at least two capabilities of the first camera system and the at least one capability of the second camera system in response to one of the multiple profiles associated with the first camera system and an identified one of the multiple profiles associated with the second camera system indicating the computing device is configured to allow the program to use the at least two capabilities of the first camera system and the at least one capability of the second camera system concurrently.

Alternatively or in addition to any of the above described methods, one of the first camera system and the second camera system having a front facing lens on the computing device, and the other of the first camera system and the second camera system having a rear facing lens on the computing device.

A method comprising: obtaining, from a first camera system of a computing device, multiple profiles associated with the first camera system, each profile of the multiple profiles identifying multiple, different capabilities of the first camera system that the computing device is configured to use concurrently; selecting a combination of capabilities identified in one of the multiple profiles associated with the first camera system that the computing device is configured to use concurrently; and presenting, as user selectable capabilities of the first camera system, ones of the capabilities identified in the selected combination.

Alternatively or in addition to any of the above described methods, any one or combination of: the multiple, different capabilities of the first camera system comprising two or more capabilities selected from the group including: recording video at one or more resolutions, capturing images at one or more resolutions, and displaying a current view of the first camera system at one or more resolutions; the multiple, different capabilities of the first camera system including capturing images at one or more resolutions as well as at least one capability selected from the grouping including: whether face detection is supported when capturing images, whether video stabilization is supported when capturing images, whether capturing variable photo sequences is supported, and whether image capture using high dynamic range imaging is supported; the multiple, different capabilities of the first camera system including recording video at one or more resolutions as well as at least one capability selected from the grouping including: whether face detection is supported when recording video, whether video stabilization is supported when recording video, and whether video high dynamic range imaging is supported; one of the multiple profiles associated with the first camera system being identified as associated with one of multiple user scenarios, and the selecting comprising selecting the combination of capabilities by selecting the one of the multiple profiles associated with the first camera system; further comprising: obtaining, from a second camera system, multiple profiles associated with the second camera system of the computing device, each profile of the multiple profiles associated with the second camera system identifying multiple, different capabilities of the second camera system that the computing device is configured to use concurrently; obtaining, from each of at least one profile of the multiple profiles associated with the first camera system, an identifier of a profile of the multiple profiles associated with the second camera system that identifies multiple, different capabilities of the second camera system that the computing device is configured to use concurrently with the capabilities identified in the profile of the first camera system; and the selecting comprising selecting only a combination of capabilities of the first camera system and the second camera system that the computing device is configured to use concurrently.

Alternatively or in addition to any of the above described methods, one of the first camera system and the second camera system having a front facing lens on the computing device, and the other of the first camera system and the second camera system having a rear facing lens on the computing device.

A computing device including a first camera system comprising: camera hardware including a lens and an image sensor; an image capture module configured to manage capturing of images using the camera hardware; a video record module configured to manage the recording of video using the camera hardware; a preview module configured to manage display of a current view being captured by the camera hardware; a camera profile record included in a storage device of the computing device, the camera profile record configured to maintain a record of multiple profiles associated with the first camera system, each profile of the multiple profiles identifying multiple, different capabilities of the image capture module, the video record module, and the preview module that the computing device is configured to use concurrently; and an interface module configured to access the storage device to obtain the multiple profiles and provide the multiple profiles to a program of the computing device, receive from the program a request to concurrently use at least two of the capabilities of the first camera system, and allow the program to concurrently use the at least two capabilities in response to at least one of the multiple profiles indicating the computing device is configured to allow the program to use the at least two capabilities concurrently.

Alternatively or in addition to any of the above described computing devices, any one or combination of: the multiple, different capabilities of the first camera system comprising two or more capabilities selected from the group including: recording video at one or more resolutions, capturing images at one or more resolutions, and displaying a current view of the first camera system at one or more resolutions; the multiple, different capabilities of the first camera system including capturing images at one or more resolutions as well as at least one capability selected from the grouping including: whether face detection is supported when capturing images, whether video stabilization is supported when capturing images, whether capturing variable photo sequences is supported, and whether image capture using high dynamic range imaging is supported; the multiple, different capabilities of the first camera system including recording video at one or more resolutions as well as at least one capability selected from the grouping including: whether face detection is supported when recording video, whether video stabilization is supported when recording video, and whether video high dynamic range imaging is supported; for each of one or more of the multiple profiles associated with the first camera system, the profile associated with the first camera system including an identifier of at least one profile of multiple profiles associated with a second camera system, each profile of the multiple profiles associated with the second camera system identifying multiple, different capabilities of the second camera system that the computing device is configured to use concurrently, each identified profile of the second camera system identifying multiple, different capabilities of the second camera system that the computing device is configured to use concurrently with the capabilities in the profile of the first camera system, and the interface module further configured to receive from the program a request to use at least one of the capabilities of the second camera system concurrently with the at least two of the capabilities of the first camera system, and allow the program to use the at least two capabilities of the first camera system and the at least one capability of the second camera system in response to one of the multiple profiles associated with the first camera system and one of the multiple profiles associated with the second camera system identified by the one profile of the first camera system indicating the computing device is configured to allow the program to use the at least two capabilities of the first camera system and the at least one capability of the second camera system concurrently; both of the first camera system and the second camera system having a lens on the computing device pointing in substantially the same direction.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
accessing a record of multiple profiles associated with a first camera system of a computing device, a first profile of the multiple profiles identifying a combination of capabilities of the first camera system that are usable concurrently, wherein the combination of capabilities includes at least video recording and image capturing;
identifying a second profile of a second camera system of the computing device that is usable concurrently with the combination of capabilities of the first camera system associated with the first profile, wherein the second profile identifies at least one capability of the second camera system that is usable concurrently with the combination of capabilities of the first camera system to provide a desired performance level of the computing device;
receiving a request to concurrently use the combination of capabilities of the first camera system with the at least one capability of the second camera system; and
allowing concurrent use of the combination of capabilities of the first camera system with the at least one capability of the second camera system.

2. The method of claim 1, wherein the first profile identifies a resolution and a frame rate for the video recording and a resolution for the image capturing.

3. The method of claim 1, wherein the first profile further includes one or more of: face detection when recording video, video stabilization recording video, and video high dynamic range imaging.

4. The method of claim 1, wherein the request specifies individual capabilities of the first camera system and the second camera system.

5. The method of claim 1, wherein the request specifies a user scenario associated with one or more capabilities of the first camera system and the second camera system.

6. The method of claim 1, wherein the first profile further identifies a third profile of a third camera system that is usable concurrently with the combination of capabilities of the first camera system associated with the first profile.

7. The method of claim 1, wherein one of the first camera system or the second camera system has a front facing lens on a computing device, and the other of the first camera system or the second camera system has a rear facing lens on the computing device.

8. The method of claim 1, wherein the first camera system and the second camera system are disposed on a same side of a computing device.

9. The method of claim 1, wherein the at least one capability of the second camera system comprises image capture at a resolution.

10. A method comprising:
accessing a record of multiple profiles associated with a first camera system of a computing device, a first profile of the multiple profiles identifying a combination of capabilities of the first camera system that are usable concurrently;
identifying a second profile of a second camera system of the computing device that is usable concurrently with the combination of capabilities of the first camera system associated with the first profile, wherein the second profile identifies at least one capability of the second camera system that is usable concurrently with the combination of capabilities of the first camera system to provide a desired performance level of the computing device;
receiving a request to concurrently use the combination of capabilities of the first camera system; and
allowing concurrent use of the combination of capabilities of the first camera system.

11. The method of claim 10, wherein the first profile identifies a resolution and a frame rate for video recording and a resolution for image capturing.

12. The method of claim 10, wherein the first profile includes at least one of: face detection when recording video, video stabilization when recording video, and video high dynamic range imaging.

13. The method of claim 10, further comprising identifying a third profile of a third camera system that is usable concurrently with the combination of capabilities of the first camera system associated with the first profile.

14. The method of claim 10, wherein one of the first camera system or the second camera system has a front facing lens on a computing device, and the other of the first camera system or the second camera system has a rear facing lens on the computing device.

15. The method of claim 10, wherein each of the first camera system and the second camera systems are disposed on a same side of a computing device.

16. The method of claim 10, wherein the request specifies a user scenario associated with one or more capabilities of the first camera system and the second camera system.

17. A system comprising:
a first camera system comprising camera hardware including a first lens and a first image sensor;
a second camera system comprising camera hardware including a second lens and a second image sensor;
one or more processors; and
one or more computer-readable storage media storing computer-executable instructions that are executable by one or more processors to perform operations comprising:
accessing a record of multiple profiles associated with a first camera system, a first profile of the multiple profiles identifying a combination of capabilities of the first camera system that are usable concurrently;
identifying a second profile of a second camera system that is usable concurrently with the combination of capabilities of the first camera system associated with the first profile, wherein the second profile identifies at least one capability of the second camera system that is usable concurrently with the combination of capabilities of the first camera system to provide a desired performance level of the computing device;

receiving a request to concurrently use the combination of capabilities of the first camera system; and allowing concurrent use of the combination of capabilities of the first camera system.

18. The system of claim 17, wherein the combination of capabilities of the first camera system include: image capture by the first camera system at a resolution, video recording by the first camera system at a resolution and frame rate, and image preview at a resolution and frame rate.

19. The system of claim 17, wherein receiving the request comprises receiving an indication of a user scenario associated with the first profile.

20. The system of claim 17, wherein one of the first camera system or the second camera system has a front facing lens on a computing device, and the other of the first camera system or the second camera system has a rear facing lens on the computing device.

* * * * *